United States Patent
Sung

[19]

[11] Patent Number: 5,808,688
[45] Date of Patent: Sep. 15, 1998

[54] METHOD AND APPARATUS FOR INTERPOLATING PIXELS FOR FORMAT CONVERSION

[75] Inventor: Jae-Seung Sung, Suwon, Rep. of Korea

[73] Assignee: Samsung Electronics Co., Ltd., Kyungki-Do, Rep. of Korea

[21] Appl. No.: 723,292

[22] Filed: Sep. 30, 1996

[30] Foreign Application Priority Data

Sep. 30, 1995 [KR] Rep. of Korea ................. 1995 33958

[51] Int. Cl.$^6$ ...................................... H04N 7/01
[52] U.S. Cl. .................... 348/441; 348/445; 348/443; 348/454; 348/458
[58] Field of Search ................... 348/441, 443, 348/445, 458, 446, 448, 454, 558, 439, 440; 382/299, 300; H04N 7/01

[56] References Cited

U.S. PATENT DOCUMENTS

| | | | |
|---|---|---|---|
| 5,307,156 | 4/1994 | Yamamoto et al. | 348/445 |
| 5,343,299 | 8/1994 | Ishikawa | 348/458 |
| 5,473,381 | 12/1995 | Lee | 348/441 |
| 5,485,216 | 1/1996 | Lee | 348/441 |
| 5,534,934 | 7/1996 | Katsumata et al. | 348/448 |
| 5,583,575 | 12/1996 | Arita et al. | 348/441 |
| 5,598,218 | 1/1997 | Inoue | 348/458 |
| 5,642,169 | 6/1997 | Yamamoto et al. | 348/458 |

FOREIGN PATENT DOCUMENTS

| | | | |
|---|---|---|---|
| 0 536 717 | 4/1993 | European Pat. Off. | H04N 7/00 |
| 2 013 067 | 8/1979 | United Kingdom | H04N 5/02 |
| 2 059 712 | 4/1981 | United Kingdom | H04N 5/02 |
| 2 129 651 | 5/1984 | United Kingdom | H04N 5/02 |
| 2 197 152 | 5/1988 | United Kingdom | H04N 7/01 |
| 2 205 713 | 12/1988 | United Kingdom | H04N 5/14 |
| 2 297 216 | 7/1996 | United Kingdom | G06F 17/17 |

*Primary Examiner*—Glenton B. Burgess
*Assistant Examiner*—Jean W. Désir
*Attorney, Agent, or Firm*—Sughrue, Mion, Zinn, Macpeak & Seas, PLLC

[57] ABSTRACT

An interpolation method and apparatus for converting pixels according to image formats, prevents deterioration of picture quality by performing a bilinear conversion which uses a larger number of pixels than does the conventional interpolation method which uses only two pixels. When a ratio between an interpolation point and a vertical line of unconverted pixels is $\Delta 1$, a ratio between the interpolation point and a horizontal line of unconverted pixels is $\Delta 2$, and eight unconverted pixels A1–A4 and B1–B4 on two lines adjacent to the interpolation position are used along with a coupling coefficient $\alpha$, a final interpolation signal I is generated according to the following equations:

$I1=(1-\Delta 1)(1-\Delta 2)A1+(1-\Delta 1)\Delta 2 A2+\Delta 1(1-\Delta 2)A3+\Delta 1\Delta 2 A4;$ $I2=(1-\Delta 1)(1-\Delta 2)B1+(1-\Delta 1)\Delta 2 B2+\Delta 1(1-\Delta 2)B3+\Delta 1\Delta 2 B4;$ and $I=\alpha I1+(1-\alpha)I2.$

13 Claims, 4 Drawing Sheets

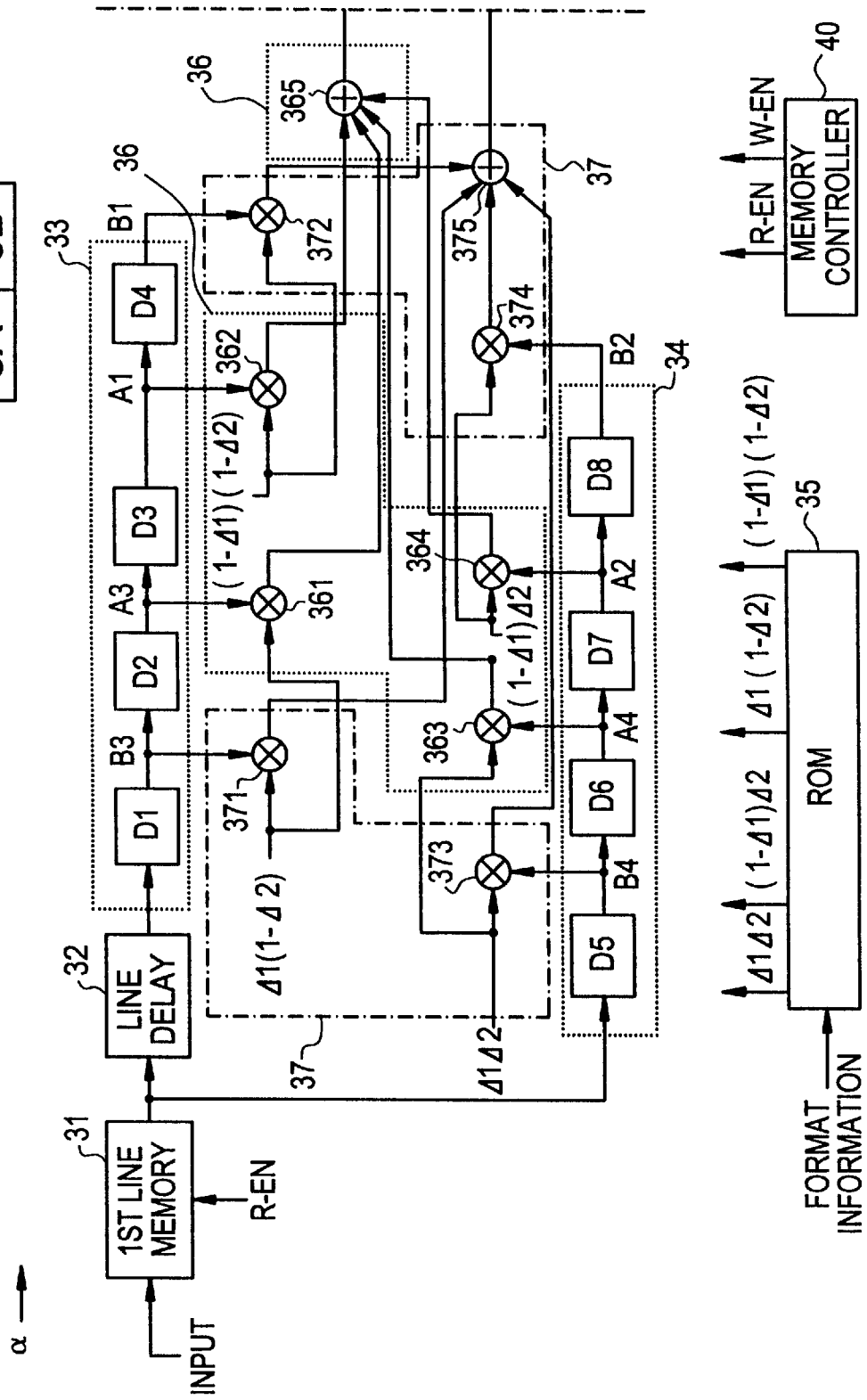

METHOD AND APPARATUS FOR INTERPOLATING PIXELS FOR FORMAT CONVERSION

BACKGROUND OF THE INVENTION

1. Field of the Invention

The present invention relates to a method and apparatus for interpolating pixels in performing a format conversion, and more particularly to a method and apparatus for interpolating pixels for a format conversion in which the interpolation method uses pixel data from two or more lines an input image signal during formatting to provide a high quality picture.

2. Description of the Related Art

As digital technology is introduced in the field of television (TV), new generation TV systems have been developed to provide high-definition picture quality, in which these new generation TV systems have inherent formats. A conventional NTSC-type TV receiver requires format conversion capabilities in order to receive and display new-generation TV programs which are transmitted in other various formats. An input and output format, based on an aspect ratio of data constituting a picture, can be converted into another format via spatial conversion. For example, to convert a 1440H ×1080V picture (having 1440 pixels in the horizontal direction and 1080 pixels in a vertical direction) into a 1280H×720V picture, a 9:8 conversion and a 3:2 conversion are required in the horizontal and vertical directions, respectively. Spatial conversion refers to interpolating an image signal comprised of pixels having a spatial relationship at a particular position, to produce pixel data at another particular position.

A conventional pixel interpolation method uses only the data of two neighboring pixels to perform format conversion, and is described below with reference to FIG. 1 which is a conceptual view for explaining the conventional interpolation method.

The conventional interpolation method uses only two neighboring pixels and considers a distance between a pixel of the new format and each of two unconverted neighboring pixels. More specifically, data for each unconverted neighboring pixel is used in the interpolation operation in inverse proportion to the distance to the pixel of the new format.

In FIG. 1, alphanumeric designations A1, A2, A3 and A4 represent the center points of pixels according to a first format, prior to performing the conversion. The other alphanumeric designations I1, I2 and I3 represent the center points of pixels according to a second, or new, format, after the conversion is performed. Pixel data corresponding to A1 and A2, which are two neighboring pixels, are interpolated to produce pixel data I1. In this case, if A1 and A2 are interpolated in approximately inverse proportion to the distances from the pixel point I1 to the respective pixel points A1 and A2, the data for pixel point I1 becomes equal to ¼A1+¾A2. Since the pixels A2 and A3 are positioned at the same distance from pixel I2, the data for pixel point I2 becomes equal to ½A2+½A3. Similarly, the data for pixel I3 becomes equal to ¾A3+¼A4, by interpolating the data for pixel points A3 and A4 in approximately inverse proportion to the distances from pixel I3 to the respective pixels A3 and A4.

However, since the conventional interpolation method uses only two neighboring pixels in performing the format conversion, a high quality picture is attained in only a limited degree.

SUMMARY OF THE INVENTION

To solve the above problem, it is an object of the present invention to provide a method and apparatus for interpolating pixels for format conversion, in which a interpolation method using pixel data from two or more lines is proposed to provide a high quality picture during format conversion.

To accomplish the above object of the present invention, there is provided a pixel interpolation apparatus for interpolating pixels of an image signal for format conversion, where the image signal contains format information relating to the format of the image signal, the pixel interpolation apparatus comprising:

a line delay unit for delaying an input image signal by one line and outputting the delayed image signal;

a first delay unit having a plurality of delay devices, for receiving the one-line delayed image signal output from said line delay unit and delaying the received one-line delayed signal by one or more pixels;

a second delay unit having a plurality of delay devices, for receiving the input image signal and delaying the received input image signal by one or more pixels;

a read-only-memory (ROM) for storing interpolation coefficients which are calculated based on horizontal and vertical ratios according to the format of the image signal, and outputting the interpolation coefficients according to the format information;

a first interpolation unit for generating a first interpolation signal, using signals within a first region of the image signal which is positioned peripherally to an interpolation position and the interpolation coefficients output from said ROM, wherein the signals within the first region are some of the signals delayed by said first and second delay units;

a second interpolation unit for generating a second interpolation signal using signals within a second region of the image signal which is positioned peripherally to the interpolation position and the interpolation coefficients output from said ROM, wherein the signals within the second region are some of the signals delayed by said first and second delay units; and an interpolation signal coupling unit for linearly coupling the first and second interpolation signals generated by said first and second interpolation units according to a coupling coefficient, and outputting a final interpolation signal.

The object of the present invention can be accomplished by providing a pixel interpolation method for interpolating pixels of an image signal for performing a format conversion, wherein the image signal includes format information specifying a format of the image signal, the pixel interpolation method comprising the steps of:

(a) calculating interpolation coefficients based on horizontal and vertical ratio distances between an interpolation point and pixels in horizontal and vertical lines of the image signal, respectively, according to the format conversion, and storing the calculated interpolation coefficients according to the format information;

(b) generating a first interpolation signal based on pixels within a first region of the image signal and the interpolation coefficients stored in said step (a), wherein the first region includes pixels located on two lines of the input image signal adjacent to the interpolation point;

(c) generating a second interpolation signal based on pixels within a second region and the interpolation coefficients stored in said step (a), wherein the second region includes pixels located on two lines of the input image signal adjacent to the interpolation point; and (d) linearly coupling the first and second interpolation signals according to a coupling coefficient, and outputting a final interpolation signal based on the linearly coupled first and second interpolation signals and coupling coefficient.

BRIEF DESCRIPTION OF THE DRAWINGS

The preferred embodiments are described with reference to the drawings, in which:

FIGS. 3A and 3B are block diagrams showing an interpolation apparatus according to one embodiment of the present invention.

DETAILED DESCRIPTION OF THE PREFERRED EMBODIMENT

A preferred embodiment of the present invention will be described below in more detail with reference to the accompanying drawings.

Figure 1:
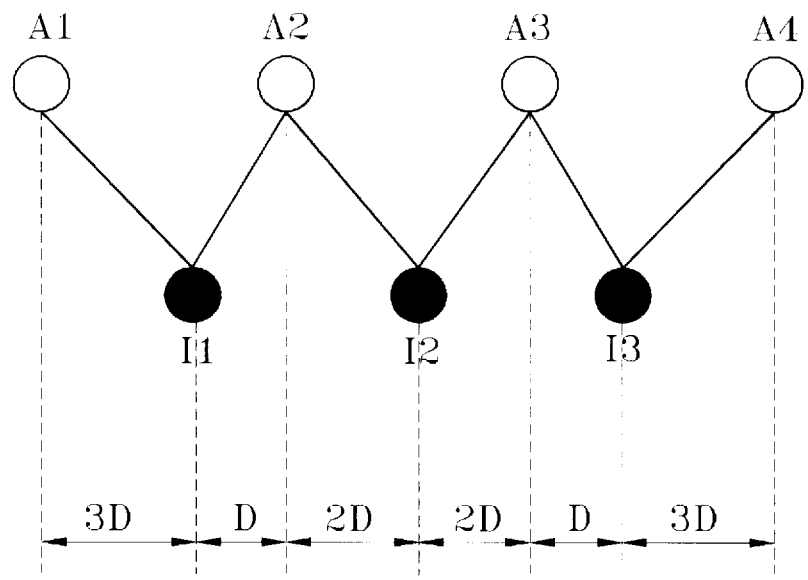
FIG. 1 is a conceptual view for explaining a conventional interpolation method.
Figure 2:
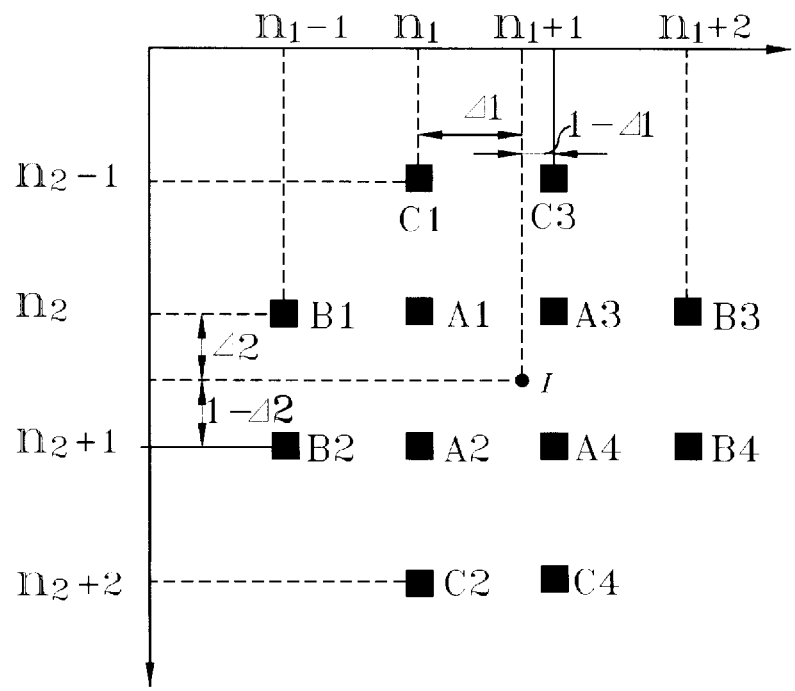
FIG. 2 is a conceptual view for explaining an interpolation method according to the present invention.

FIG. 2 shows a conceptual view for explaining an interpolation method according to the present invention, in which a pixel corresponding to a new format is designated by the character I, and pixels corresponding to a previous format are designated as A1 to A4, B1 to B4, and C1 to C4. The distance between pixel I and an adjacent vertical line is designated by $\Delta 1$, in which $\Delta 1$ represents a distance ratio between pixel I and the vertical line to the left of and adjacent to pixel I. The distance ratio between pixel I and the vertical line to the right of and adjacent to pixel I is represented by $1-\Delta 1$. The distance between pixel I and an adjacent horizontal line is designated by $\Delta 2$, in which $\Delta 2$ represents the distance ratio between pixel I and the horizontal line above and adjacent to pixel I. The distance ratio between pixel I and the horizontal line below and adjacent to pixel I is represented by $1-\Delta 2$.

In the present invention, interpolation of the pixels is performed by using data for the pixels in inverse proportion to the distance ratio of neighboring pixels with respect to an interpolation pixel. Now, interpolation using four pixels will be described. The four pixels A1, A2, A3 and A4 of the two horizontal lines adjacent to interpolation pixel I, which fall within a first region around the interpolation pixel I, are used and interpolated in the following manner, according to equation 1.

$$I=(1-\Delta 1)(1-\Delta 2)A1+(1-\Delta 1)\Delta 2 A2+\Delta 1(1-\Delta 2)A3+\Delta 1\Delta 2 A4 \ldots \quad (1)$$

Next, interpolation using eight pixels is performed with a bilinear interpolation method using pixels A1–A4 and B1–B4. That is, a first intermediate interpolation pixel I1 is obtained by using the four adjacent pixels A1–A4 of the first region according to equation 2, and a second intermediate interpolation pixel I2 is obtained by using the four adjacent pixels B1–B4 according to equation 3, where pixels B1–B4 are within a second region around the interpolation pixel I. Then, a final interpolation pixel I is obtained using I1 and I2 according to equation 4.

$$I1=(1-\Delta 1)(1-\Delta 2)A1+(1-\Delta 1)\Delta 2 A2+\Delta 1(1-\Delta 2)A3+\Delta 1\Delta 2 A4 \ldots \quad (2)$$

$$I2=(1-\Delta 1)(1-\Delta 2)B1+(1-\Delta 1)\Delta 2 B2+\Delta 1(1-\Delta 2)B3+\Delta 1\Delta 2 B4 \ldots \quad (3)$$

$$I=\alpha I1+(1-\alpha)I2 \ldots \quad (4)$$

Here, $\alpha$ is a number smaller than 1 and is selected according to a weighted ratio of the intermediate interpolation pixels I1 and I2.

Then, a bilinear interpolation using twelve pixels is performed using pixels A1–A4, B1–B4 and C1–C4 from the two horizontal lines and two vertical lines adjacent to interpolation pixel I. That is, a first intermediate interpolation pixel I1 is obtained by using the four adjacent pixels A1–A4 according to equation 5, and a second intermediate interpolation pixel I2 is obtained by using the four adjacent pixels B1–B4 according to equation 6, and a third intermediate interpolation pixel I3 is obtained by using the four adjacent pixels C1–C4 according to equation 7, in which pixels C1–C4 are within a third region around the interpolation pixel I. Then, a final interpolation pixel I is obtained by using I1, I2 and I3 according to equation 8.

$$I1=(1-\Delta 1)(1-\Delta 2)A1+(1-\Delta 1)\Delta 2 A2+\Delta 1(1-\Delta 2)A3+\Delta 1\Delta 2 A4 \ldots \quad (5)$$

$$I2=(1-\Delta 1)(1-\Delta 2)B1+(1-\Delta 1)\Delta 2 B2+\Delta 1(1-\Delta 2)B3+\Delta 1\Delta 2 B4 \ldots \quad (6)$$

$$I3=(1-\Delta 1)(1-\Delta 2)C1+(1-\Delta 1)\Delta 2 C2+\Delta 1(1-\Delta 2)C3+\Delta 1\Delta 2 C4 \ldots \quad (7)$$

$$I=\alpha I1+(1-\alpha)(I2+I3)/2 \ldots \quad (8)$$

Figure 3B:
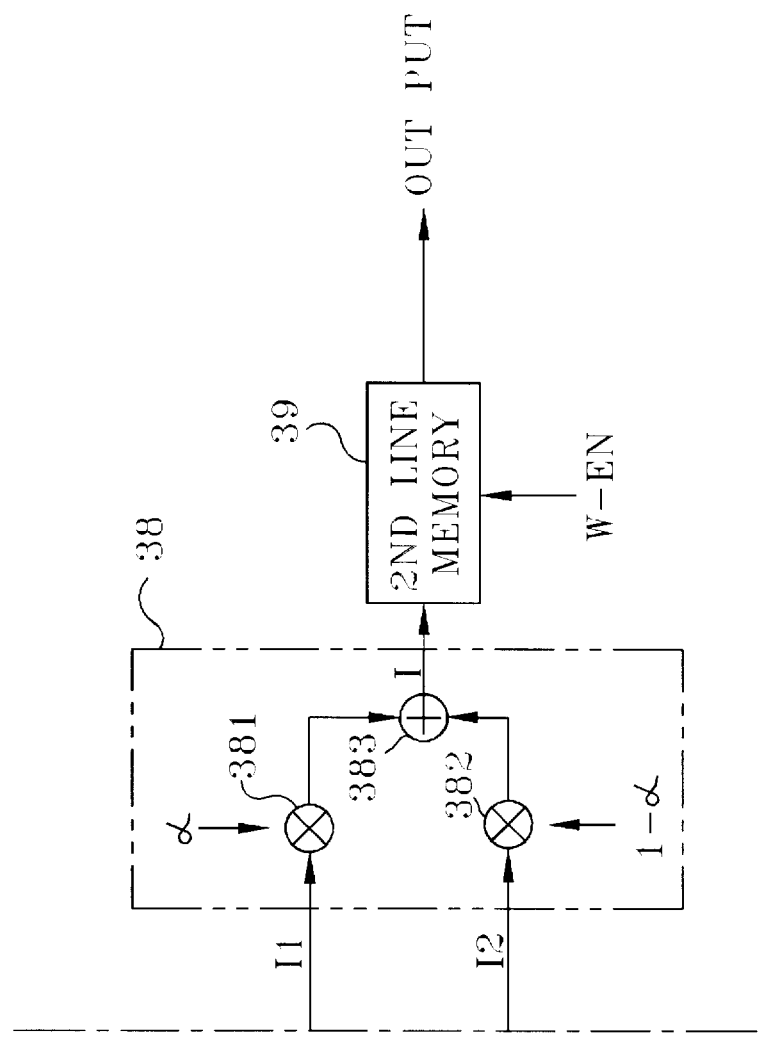

FIGS. 3A and 3B are block diagrams showing an interpolation apparatus according to one embodiment of the present invention, which uses the eight pixels discussed above.

As shown in FIG. 3A, the interpolation apparatus according to the present invention includes a first line memory 31 for storing an input image signal in units of a line, and a line delay 32 for delaying the image signal output from first line memory 31 in units of one horizontal line (1H) and outputting the delayed image signal. The output of line delay 32 is supplied to a first delay unit 33 having a plurality of delay devices D1–D4. The output of the first line memory 31 is also supplied to a second delay unit 34 having a plurality of delay devices D5–D8. The interpolation apparatus according to the present invention also includes a read-only memory (ROM) 35 which stores interpolation coefficients according to format information contained in the input data.

A first interpolator 36 for calculating first intermediate interpolation pixel I1 using pixel data A1–A4 includes multipliers 361–364 which multiply the pixel data delayed with delay devices D2, D3, D6 and D7 by the interpolation coefficients supplied from ROM 35, and an adder 365 which adds the outputs of the multipliers 361–364.

A second interpolator 37 for calculating second intermediate interpolation pixel I2 using pixel data B1–B4 includes multipliers 371–374 which multiply the pixel data delayed with delay devices D1, D4, D5 and D8 by the interpolation coefficients supplied from ROM 35, and an adder 375 which adds the outputs of multipliers 371–374. An interpolation signal coupler 38, shown in FIG. 3B, for calculating a final interpolation pixel I using the first and second intermediate interpolation pixels I1 and I2 includes multipliers 381 and 382 which couple the respective intermediate interpolation pixels I1 and I2 with coupling coefficients $\alpha$ and $1-\alpha$, and an adder 383 which adds the outputs of multipliers 381 and 382. The interpolation signal coupler 38 is connected to a second line memory 39 for storing the final interpolation pixel I. The reading of data from first line memory 31 and the writing of data in the second line memory 39 are controlled by a memory controller 40.

The operation of the interpolation apparatus according to the present invention as discussed above is described below in detail.

Taking as a specific example the case where a picture format having an aspect ratio of 1440H ×1080V is converted into another picture format having an aspect ratio of 1280H×720V, an interpolation operation according to the present invention is performed as follows. In this case, data should be compressed by a ratio of 9:8 in the horizontal direction and by a ratio of 3:2 in the vertical direction. In the interpolation apparatus according to the present invention, these data compression ratios become input and output ratios in the horizontal and vertical directions, respectively.

Figure 4:
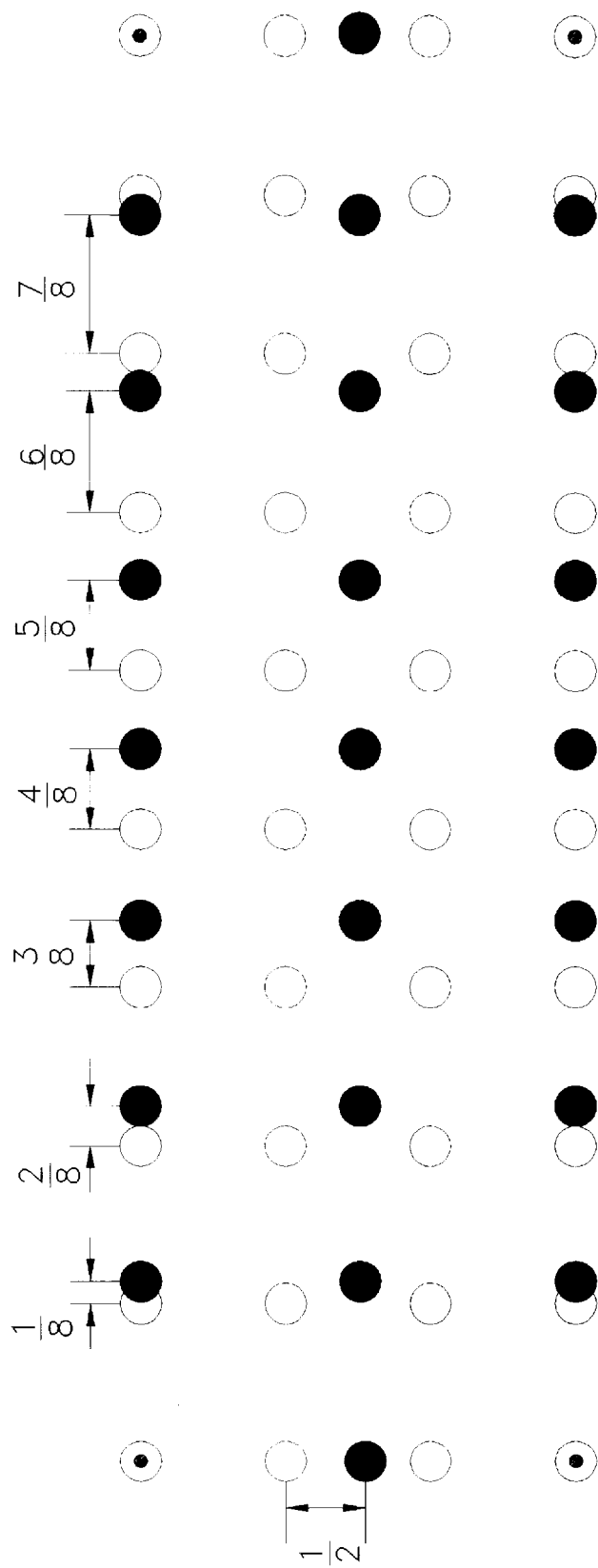
FIG. 4 is a conceptual view for explaining horizontal and vertical distance ratios between an input and output of an interpolation apparatus according to the present invention.

FIG. 4 is a conceptual view for explaining horizontal and vertical ratios between an input and an output in the interpolation apparatus of the present invention. In FIG. 4, the pixels indicated by the symbol ⊙ have an input and an output which are coincident with each other. That is, pixels for the new format in that location are in the same location as pixels for the previous format. The pixels indicated by the symbol ○ represent input pixels, or in other words previous pixels. The pixels indicated by the symbol ● represent output pixels, or in other words new pixels, corresponding to previous pixels which have been converted to the new format. As shown in FIG. 4, the distance ratio Δ1 between vertical lines of the input pixels with respect to the output pixels is ⅛, ⅖, ⅜, ⅘, ⅝, ⅞ or ⅞, and the distance ratio Δ2 between horizontal lines of the input pixels with respect to the output pixels is ½.

The input image signal is stored in the first line memory 31, which outputs the stored data according to a read enable signal R-EN applied from memory controller 40. The data output from first line memory 31 is supplied to line delay unit 32 and second delay unit 34. Line delay unit 32 delays the input signal by 1H, and the 1H delayed signal is input to first delay unit 33.

The first delay unit 33 sequentially delays the 1H delayed signal by each clock pulse, via delay devices D1–D4, in which each delay device provides a one-pixel delay, thereby delaying the 1H delayed signal by a total of four pixels. The second delay unit 34 sequentially delays the input signal by each clock pulse, via delay devices D5–D8, in which each delay device provides a one-pixel delay, thereby delaying the input signal by a total of four pixels. Referring to FIG. 2, the signals delayed in the first delay unit 33 are pixels B1, A1, A3 and B3 on the line $n_2$, and the signals delayed in the second delay unit 34 are pixels B2, A2, A4 and B4 on the line $n_{2+1}$.

The first interpolator 36 multiplies in multipliers 361–364, pixels A1–A4 existing in a first region by the interpolation coefficients output from the ROM 35, where the first region is peripheral to the position to be interpolated and pixels A1–A4 are among the signals delayed by the delay devices of first and second delay units 33 and 34. The first interpolator 36 then adds the multiplied results in adder 365 and outputs the first intermediate interpolation pixel I1.

The second interpolator 37 multiplies in multipliers 371–374, pixels B1–B4 which exist in a second region by the interpolation coefficients output from ROM 35, where the second region is peripheral to the position to be interpolated and pixels B1–B4 are among the signals delayed by the delay devices of first and second delay units 33 and 34. Second interpolator 37 then adds the multiplied results in adder 375 which outputs the second intermediate interpolation pixel I2.

ROM 35 includes a table which contains coefficients calculated according to the input and output ratios based on the specific format conversion, and outputs the interpolation coefficients to the respective multipliers 361–364 and 371–374, according to format information from the input signal.

The interpolation signal coupler 38 couples the intermediate interpolation signals I1 and I2 which are obtained from the first and second interpolators 36 and 37, respectively, using a coupling coefficient α. That is, multiplier 381 multiplies the signal I1 output from first interpolator 36 by coupling coefficient α, and multiplier 382 multiplies signal I2 output from second interpolator 37 by a coupling coefficient 1−α. The adder 383 adds the outputs from both multipliers 381 and 382 and outputs the final interpolation pixel I. The coupling coefficient α has a value not less than 0 and not more than 1 and is determined experimentally. That is, coupling coefficient α represents a proportion of the first interpolation signal to the second interpolation signal, and is determined by a user. The larger the value of α, the more of the data from the region close to an interpolation position is represented.

The second line memory 39 stores the final interpolation pixel I output from adder 383 of interpolation signal coupler 38, in which data is compressed and stored according to a write enable signal W-EN received from memory controller 42.

According to the above operation, the interpolation apparatus shown in FIG. 3 receives the eight pixels A1–A4 and B1–B4, generates the intermediate interpolation signals (pixels) I1 and I2, and outputs the final interpolation signal (pixel) I.

As described above, the present invention prevents deterioration of picture quality by employing a bilinear conversion which uses a larger number of pixels than does the conventional interpolation method which uses only two pixels.

In another embodiment, even more pixels, namely, C1–C4 shown in FIG. 4, are employed in the interpolation apparatus discussed above. Here a third intermediate interpolation signal I3 is calculated and employed in a manner similar to that of intermediate interpolation signals I1 and I2 discussed above.

While only certain embodiments of the invention have been specifically described herein, it will apparent that numerous modifications may be made thereto without departing from the spirit and scope of the invention.

What is claimed is:

1. A pixel interpolation apparatus for interpolating pixels of an image signal for format conversion, where the image signal contains format information relating to the format of the image signal, the pixel interpolation apparatus comprising:

a line delay unit for delaying an input image signal by one line and outputting the delayed image signal;

a first delay unit having a plurality of delay devices, for receiving the one-line delayed image signal output from said line delay unit and delaying the received one-line delayed signal by one or more pixels;

a second delay unit having a plurality of delay devices, for receiving the input image signal and delaying the received input image signal by one or more pixels;

a read-only-memory (ROM) for storing interpolation coefficients which are calculated based on horizontal and vertical ratios according to the format of the image signal, and outputting the interpolation coefficients according to the format information;

a first interpolation unit for generating a first interpolation signal, using signals within a first region of the image signal which is positioned peripherally to an interpolation position and the interpolation coefficients output from said ROM, wherein the signals within the first region are some of the signals delayed by said first and second delay units;

a second interpolation unit for generating a second interpolation signal using signals within a second region of the image signal which is positioned peripherally to the interpolation position and the interpolation coefficients output from said ROM, wherein the signals within the second region are some of the signals delayed by said first and second delay units; and an interpolation signal coupling unit for linearly coupling the first and second interpolation signals generated by said first and second interpolation units according to a coupling coefficient, and outputting a final interpolation signal.

2. The pixel interpolation apparatus according to claim 1, further comprising:

a first line memory for storing the image signal in units of a line and outputting the stored data according to a read enable signal;

a second line memory for compressing and storing the final interpolation signal according to a write enable signal; and a memory controller for generating and outputting said read enable signal and said write enable signal.

3. The pixel interpolation apparatus according to claim 1, wherein said first interpolation unit comprises:

a plurality of multipliers for multiplying the pixels in the first region by the interpolation coefficients output from said ROM; and an adder for adding outputs of said plurality of multipliers.

4. The pixel interpolation apparatus according to claim 1, wherein said second interpolation unit comprises:

a plurality of multipliers for multiplying the pixels in the second region except for the pixels in the first region by the interpolation coefficients output from said ROM; and an adder for adding outputs of said plurality of multipliers.

5. The pixel interpolation apparatus according to claim 1, wherein said interpolation signal coupling unit comprises:

a first multiplier for multiplying the first interpolation signal generated by said first interpolation unit by said coupling coefficient, where said coupling coefficient is represented by $\alpha$;

a second multiplier for multiplying the second interpolation signal generated by said second interpolation unit by $(1-\alpha)$; and an adder for adding outputs of said first and second multipliers.

6. A pixel interpolation method for interpolating pixels of an image signal for performing a format conversion, wherein the image signal includes format information specifying a format of the image signal, the pixel interpolation method comprising the steps of:

(a) calculating interpolation coefficients based on horizontal and vertical ratio distances between an interpolation point and pixels in horizontal and vertical lines of the image signal, respectively, according to the format conversion, and storing the calculated interpolation coefficients according to the format information;

(b) generating a first interpolation signal based on pixels within a first region of the image signal and the interpolation coefficients stored in said step (a), wherein the first region includes pixels located on two lines of the input image signal adjacent to the interpolation point;

(c) generating a second interpolation signal based on pixels within a second region and the interpolation coefficients stored in said step (a), wherein the second region includes pixels located on two lines of the input image signal adjacent to the interpolation point; and (d) linearly coupling the first and second interpolation signals according to a coupling coefficient, and outputting a final interpolation signal based on the linearly coupled first and second interpolation signals and coupling coefficient.

7. The pixel interpolation method according to claim 6, wherein said step (a) uses a horizontal ratio $\Delta 1$ and a vertical ratio $\Delta 2$ according to the format conversion, calculates and stores values $(1-\Delta 1)(1-\Delta 2)$, $(1-\Delta 1)\Delta 2$, $\Delta 1(1-\Delta 2)$, and $\Delta 1\Delta 2$ as the interpolation coefficients and outputs the interpolation coefficients according to the format information, wherein $\Delta 1$ relates to a distance between the interpolation point and a vertical line of pixels of the input signal to the left of and adjacent to the interpolation point, and $\Delta 2$ relates to a distance between the interpolation point and a horizontal line of pixels of the input signal above and adjacent to the interpolation point.

8. The pixel interpolation method according to claim 7, wherein said step (b) uses four pixels A1–A4 which are closest to the interpolation point among pixels located on the two lines adjacent to the interpolation point to obtain the first interpolation signal I1, according to the following formula:

$$I1=(1-\Delta 1)(1-\Delta 2)A1+(1-\Delta 1)\Delta 2 A2+1(1-\Delta 2)A3+\Delta 1\Delta 2 A4.$$

9. The pixel interpolation method according to claim 8, wherein said step (c) uses four pixels B1–B4 which are closest to the interpolation point among the pixels located on the adjacent two lines except for the pixels A1–A4 to obtain the second interpolation signal I2, according to the following formula:

$$I2=(1-\Delta 1)(1-\Delta 2)B1+(1-\Delta 1)\Delta 2 B2+\Delta 1(1-\Delta 2)B3+\Delta 1\Delta 2 B4.$$

10. The pixel interpolation method according to claim 9, wherein said step (d) generates the final interpolation signal I, according to the following formula, wherein the coupling coefficient is $\alpha$:

$$I=\alpha I1+(1-\alpha)I2.$$

11. The pixel interpolation method according to claim 9, further comprising the step:

(e) generating a third interpolation signal I3 based on four pixels C1–C4 which are closest to the interpolation position among pixels located on two other lines adjacent to the interpolation point except for the signals A1–A4, wherein the third interpolation signal I3 is generated according to the following formula:

$$I3=(1-\Delta 1)(1-\Delta 2)C1+(1-\Delta 1)\Delta 2 C2+\Delta 1(1-\Delta 2)C3+\Delta 1\Delta 2 C4.$$

12. The pixel interpolation method according to claim 11, wherein said step (d) generates the final interpolation signal I according to the following formula, wherein the coupling coefficient is $\alpha$:

$$I=\alpha I1+(1-\alpha)(I2+I3)/2.$$

13. The pixel interpolation method according to claim 11, wherein said two adjacent lines are oriented in a horizontal direction and said other two adjacent lines are oriented in a vertical direction.

* * * * *